(12) United States Patent
Hosmani et al.

(10) Patent No.: US 10,366,199 B2
(45) Date of Patent: Jul. 30, 2019

(54) CELL-BASED POWER GRID (PG) ARCHITECTURE

(71) Applicant: QUALCOMM Incorporated, San Diego, CA (US)

(72) Inventors: Jagadish Hosmani, San Diego, CA (US); Mohammed Yousuff Shariff, San Diego, CA (US); Venugopal Sanaka, San Diego, CA (US); Huibo Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/484,615

(22) Filed: Apr. 11, 2017

(65) Prior Publication Data

US 2018/0293344 A1 Oct. 11, 2018

(51) Int. Cl.
*H02J 3/00* (2006.01)
*G06F 17/50* (2006.01)
*H01L 23/528* (2006.01)
*H01L 27/02* (2006.01)

(52) U.S. Cl.
CPC ...... *G06F 17/5077* (2013.01); *G06F 17/5068* (2013.01); *G06F 17/5072* (2013.01); *H01L 23/5286* (2013.01); *H01L 27/0207* (2013.01); *G06F 2217/08* (2013.01); *G06F 2217/78* (2013.01); *H02J 3/00* (2013.01)

(58) Field of Classification Search
USPC ....................................................... 716/120
See application file for complete search history.

(56) References Cited

U.S. PATENT DOCUMENTS

| | | | |
|---|---|---|---|
| 6,111,310 A | 8/2000 | Schultz | |
| 6,346,721 B1 | 2/2002 | Schultz | |
| 6,823,499 B1 | 11/2004 | Vasishta et al. | |
| 6,925,627 B1 | 8/2005 | Longway et al. | |
| 7,761,831 B2 | 7/2010 | Mai et al. | |
| 9,230,049 B1 | 1/2016 | Li et al. | |
| 2007/0094630 A1 | 4/2007 | Bhooshan | |
| 2008/0169525 A1* | 7/2008 | Ang | H04N 5/335 257/443 |
| 2011/0272782 A1 | 11/2011 | Yang | |
| 2012/0066530 A1 | 3/2012 | Suzuki et al. | |

(Continued)

FOREIGN PATENT DOCUMENTS

WO 2007073599 A1 7/2007

OTHER PUBLICATIONS

International Search Report and Written Opinion—PCT/US2018/024315—ISA/EPO—dated Jun. 22, 2018.

*Primary Examiner* — Mohammed Alam
(74) *Attorney, Agent, or Firm* — Qualcomm Incorporated (57) ABSTRACT

Aspects of the disclosure are directed to a metal only cell-based power grid (PG) architecture. In accordance with one aspect, the power gird (PG) architecture includes a cell building block structure with a NxM grid configuration including N cell building blocks arranged in a first direction and M cell building blocks arranged in a second direction, wherein the first direction and the second direction are orthogonal to one another; and a plurality of power grid (PG) cells, wherein each of the N cell building blocks and each of the M cell building blocks are occupied by a PG cell of the plurality of PG cells.

29 Claims, 5 Drawing Sheets

(56) References Cited

U.S. PATENT DOCUMENTS

2014/0114636 A1\* 4/2014 Daloukas ............ G06F 17/5036
                                                            703/14
2015/0349526 A1   12/2015 Duby et al.
2015/0370953 A1   12/2015 Frederick, Jr. et al.

\* cited by examiner

CELL-BASED POWER GRID (PG) ARCHITECTURE

TECHNICAL FIELD

This disclosure relates generally to the field of power grids, and, in particular, to a metal only cell-based power grid (PG) architecture.

BACKGROUND

Electronic chips, for example a system on a chip (SOC), require dc power distribution for proper functioning. DC power distribution on an electronic chip may employ a pre-defined power grid (PG) architecture for each design prior to the place and route step in manufacturing. The place and route step is the process by which individual chip elements are positioned within the chip and interconnected to form a functioning circuit system. Conventionally, a uniform power grid architecture may be assigned to the entire circuit system. The uniform power grid architecture may include an array of vertical conductive lines and horizontal conductive lines. This architecture may limit design optimization with respect to routability (i.e., ability to interconnect elements) and voltage drop (e.g, IR drop with I=current and R=resistance) due to line resistance. Conventionally, to address a local routability issue, the entire power grid must be redesigned. Similarly, in the conventional method, to address local voltage drop issues, the entire power grid must be redesigned. Hence, a local routability issue or a local voltage drop issue is addressed at the entire power grid in a global manner which can adversely affect optimization for the rest of the power grid elements.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a power gird (PG) architecture, including a cell building block structure with a N×M grid configuration including N cell building blocks arranged in a first direction and M cell building blocks arranged in a second direction, wherein the first direction and the second direction are orthogonal to one another; and a plurality of power grid (PG) cells, wherein each of the N cell building blocks and each of the M cell building blocks are occupied by a PG cell of the plurality of PG cells.

Another aspect of the disclosure provides a method for placement and routing one or more power grid (PG) cells on a power grid (PG) architecture, the method including determining a N×M grid configuration of the power grid (PG) architecture, wherein the N×M gird configuration includes NM quantity of cell building blocks; determining a type of PG cell for placement on one of the cell building blocks; and placing a PG cell of the determined type of PG cell on the one of the cell building blocks. In one example, the method further includes determining if a determination of the type of PG cell has been made for each of the NM quantity of cell building blocks. In one example, the method further includes determining if the PG cell is a basic PG cell, and if the basic PG cell should be replaced by an optimized PG cell. In one example, the method further includes determining at least one horizontal grid dimension A and at least one vertical grid dimension B of the N×M grid configuration. In one example, the method further includes using one or more electrical interconnects to stitch the PG cell to the one or more PC cells of the power grid (PG) architecture.

Another aspect of the disclosure provides an apparatus for placement and routing one or more power grid (PG) cells on a power grid (PG) architecture, the apparatus includes means for determining a N×M grid configuration of the power grid (PG) architecture, wherein the N×M gird configuration includes NM quantity of cell building blocks; means for determining a type of PG cell for placement on one of the cell building blocks; and means for placing a PG cell of the determined type of PG cell on the one of the cell building blocks. In one example, the apparatus further includes means for determining if a determination of the type of PG cell has been made for each of the NM quantity of cell building blocks. In one example, the apparatus further includes means for determining if the PG cell is a basic PG cell, and means for determining if the basic PG cell should be replaced by an optimized PG cell. In one example, the apparatus further includes means for determining at least one horizontal grid dimension A and at least one vertical grid dimension B of the N×M grid configuration. In one example, the apparatus further includes means for stitching one or more electrical interconnects to the PG cell to the one or more PC cells of the power grid (PG) architecture.

Another aspect of the disclosure provides a computer-readable medium storing computer executable code, operable on a device comprising at least one processor and at least one memory coupled to the at least one processor, wherein the at least one processor is configured to place and route one or more power grid (PG) cells on a power grid (PG) architecture, the computer executable code including instructions for causing a computer to determine a N×M grid configuration of the power grid (PG) architecture, wherein the N×M gird configuration includes NM quantity of cell building blocks; instructions for causing the computer to determine a type of PG cell for placement on one of the cell building blocks; instructions for causing the computer to place a PG cell of the determined type of PG cell on the one of the cell building blocks; and instructions for causing the computer to use one or more electrical interconnects to stitch the PG cell to the one or more PC cells of the power grid (PG) architecture.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for power grid (PG) architecture. DC power distribution in electronic chips (e.g., system on a chip, SOC) includes circuit systems that use power grids (PG). The present disclosure relates to a non-uniform power grid architecture which is cell-based (i.e., a cell-based power grid architecture). The cell-based power grid architecture allows design optimization with respect to routability and voltage drop (i.e., IR drop) due to line resistance. The various aspects of the disclosure provide a power grid architecture that may address local routability demands and/or local voltage drop demands as well as to minimize overall chip area without requiring undesired global effect on the performance of the power grid. In one aspect, improved routability translates to improved overall chip area, i.e. less chip area for the same power grid requirements. In another aspect, improved voltage drop (i.e. reduced voltage drop due to line resistance) translates to improved circuit performance, e.g. improved voltage margin, improved timing margin, etc.

In various representative aspects, the disclosed cell-based power grid (PG) architecture uses metal only PG cells within a hard-coded circuit macro ("hard macro"). In one aspect, a hard-coded circuit macro is a part of a circuit system. The PG cell structure is highly configurable to allow trades between voltage drop and routability. In contrast to a uniform power grid architecture with an array of vertical and horizontal conductive lines, the cell-based power grid architecture may employ metal only PG cells with optimized characteristics as fundamental building blocks. In various aspects, the metal only PG cells may be stitched together using electrical interconnects. Cell characteristics allow for improved routability with fewer metal traces, and/or allow for reduced voltage drop with more metal traces. A power grid (PG) architecture with cells as its building blocks allows the power grid (PG) architecture to meet the varying local routability demands and/or local voltage drop demands within a hard-coded circuit macro.

In one aspect, the cell-based power grid (PG) architecture allows for the placement of one or more cells to be strategically located on the hard-coded circuit macro wherein each of the one or more cells has an implemented cell structure that is optimized for routability, reduced voltage drop or a balance between routability and reduced voltage drop to meet the various local routability demands and/or local voltage drop demands of a hard-coded circuit macro.

Figure 1:
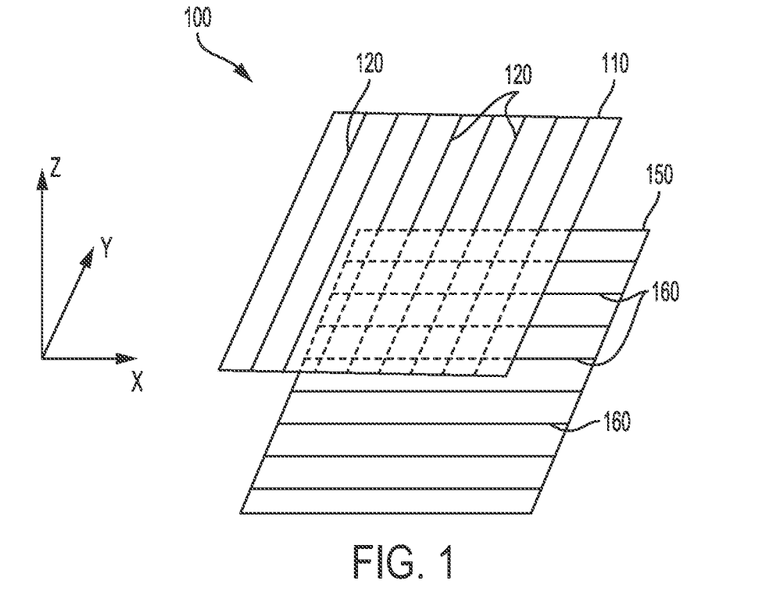
FIG. 1 is an expanded view of an example power grid (PG) cell.

FIG. 1 illustrates an expanded view of an example power grid (PG) cell 100. In one example, the PG cell 100 may include a first plurality of power supply lines 120 which are laid parallel to each other on a first plane 110 in the y-axis direction. In an example, each of the first plurality of power supply lines 120 is uniformly spaced to each of the other first plurality of power supply lines 120. In another example, the first plurality of power supply lines 120, although laid parallel to each other, are not uniformly spaced between one another. The first plurality of supply lines 120 may be metal strips.

Additionally, the PG cell 100 may include a second plurality of power supply lines 160 which are laid parallel to each other on a second plane 150 in the x-axis direction. In an example, each of the second plurality of power supply lines 160 is uniformly spaced to each of the other second plurality of power supply lines 160. In another example, the second plurality of power supply lines 160, although laid parallel to each other, are not uniformly spaced between one another. The second plurality of supply lines 160 may be metal strips. In one aspect, the first plane 110 and the second plane 150 are parallel planes in the z-axis direction.

Figure 2:
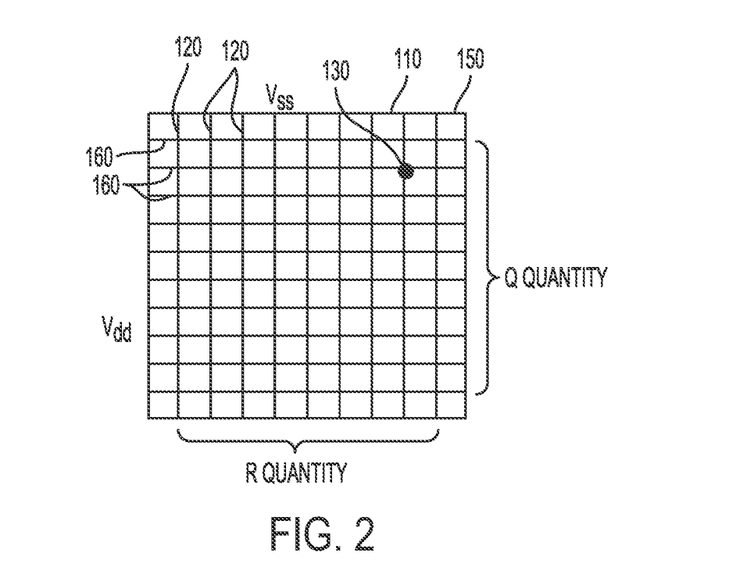
FIG. 2 is a top view of the example power grid (PG) cell of FIG. 1.

In one example, one or more of the first plurality of power supply lines 120 is electrically coupled to one or more of the second plurality of power supply lines 160. The electrical coupling, for example, may be accomplished through a via 130 shown in FIG. 2. FIG. 2 is a top view of the example power grid (PG) cell 100 of FIG. 1. Although only one via 130 is illustrated in FIG. 2, one skilled in the art would understand that some PG cells may include more than one vias to electrically couple the power supply lines 120 on the first plane 110 to the power supply lines 160 on the second plane 150.

In one aspect, each of the power supply lines 120, 160 supplies a voltage to an electronic component (not shown). For example, Vdd may refer to a drain voltage for a metal oxide semiconductor (MOS) transistor and Vss may refer to a source voltage for a MOS transistor. FIG. 2 shows only one Vdd and one Vss even though more than one drain voltage and more than one source voltage may be present in a PG cell. Although Vdd and Vss are illustrated in FIG. 2, other supply voltages may be supplied on the power supply lines 120, 160. In one example, in FIG. 2, Vdd and Vss are shown orthogonal to each other on the PG cell, i.e. Vdd and Vss are supplied on orthogonal PG cell axes. In another example, Vdd and Vss may be parallel to each other on the PG cell, i.e. Vdd and Vss are supplied on parallel PG cell axes.

Figure 3:
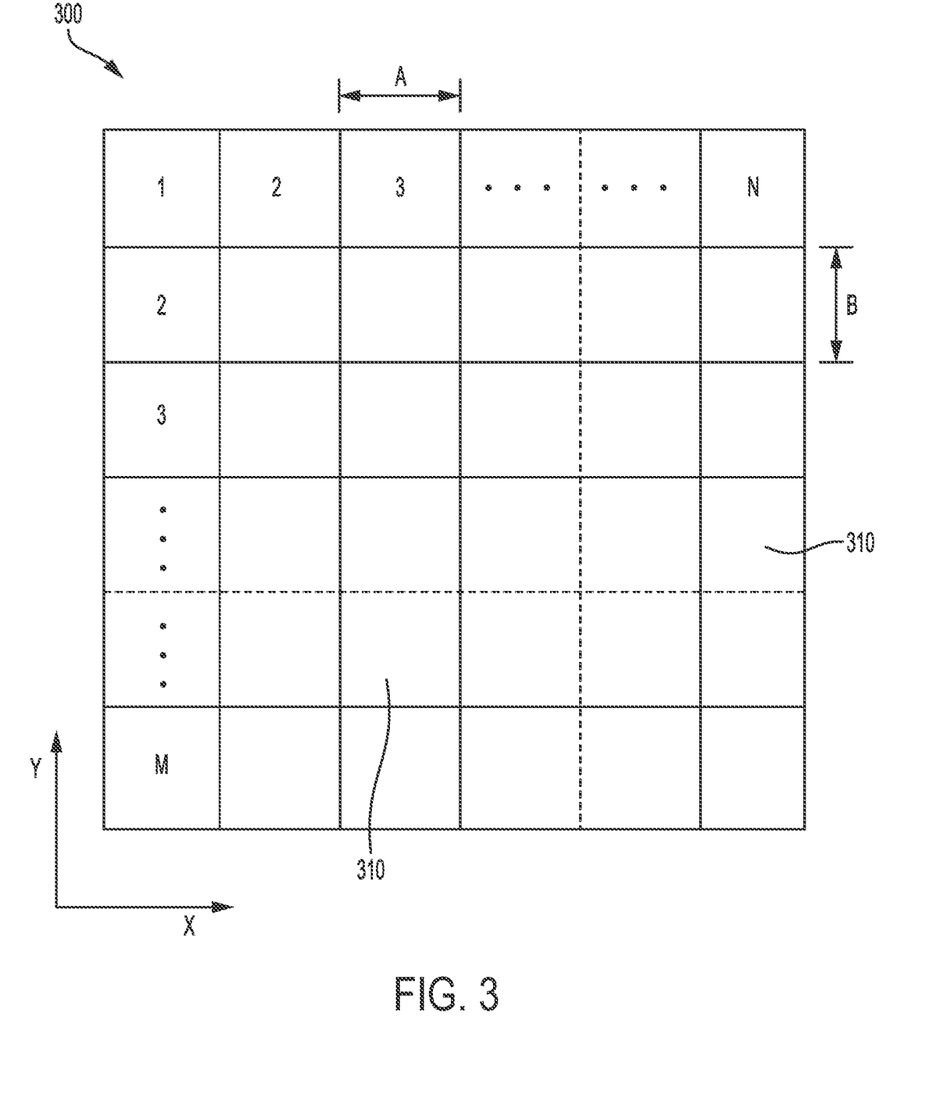
FIG. 3 illustrates a first example power grid architecture that includes power grid (PG) cells as its building blocks.

FIG. 3 illustrates a first example power grid (PG) architecture 300 that includes power grid (PG) cells 310 as its building blocks. That is, the power grid (PG) architecture 300 may include a cell building block structure with a N×M grid configuration including N cell building blocks arranged in a first direction and M cell building blocks arranged in a second direction, wherein the first direction and the second direction are orthogonal to one another. For example, the first direction may be a horizontal direction (a.k.a. x-direction), and the second direction may be a vertical direction (a.k.a. y-direction).

For example, the power grid (PG) architecture 300 is comprised of a plurality of PG cells 310 arranged in a square or rectangular grid structure (i.e., a cell building block structure) with a horizontal grid spacing having a first grid dimension A and a vertical grid spacing with a second grid dimension B. The power grid architecture 300 is shown as including N×M PG cells with N quantity PG cells arranged in the horizontal direction (a.k.a. x-direction) and M quantity PG cells arranged in the vertical direction (a.k.a. y-direction). N and M are integer numbers, and one skilled in the art would understand that the number of PG cells in a power grid architecture would depend on the application and/or design choice. In FIG. 3, the PG cells 310 are shown to be approximately square in shape in the x-y plane. That is, the first grid dimension A and the second grid dimension B appear to be approximately the same in length. However, in other aspects, the PG cells (for example PG cells 410) may be more rectangular in shape with different grid dimensions as shown in FIG. 4.

Figure 4:
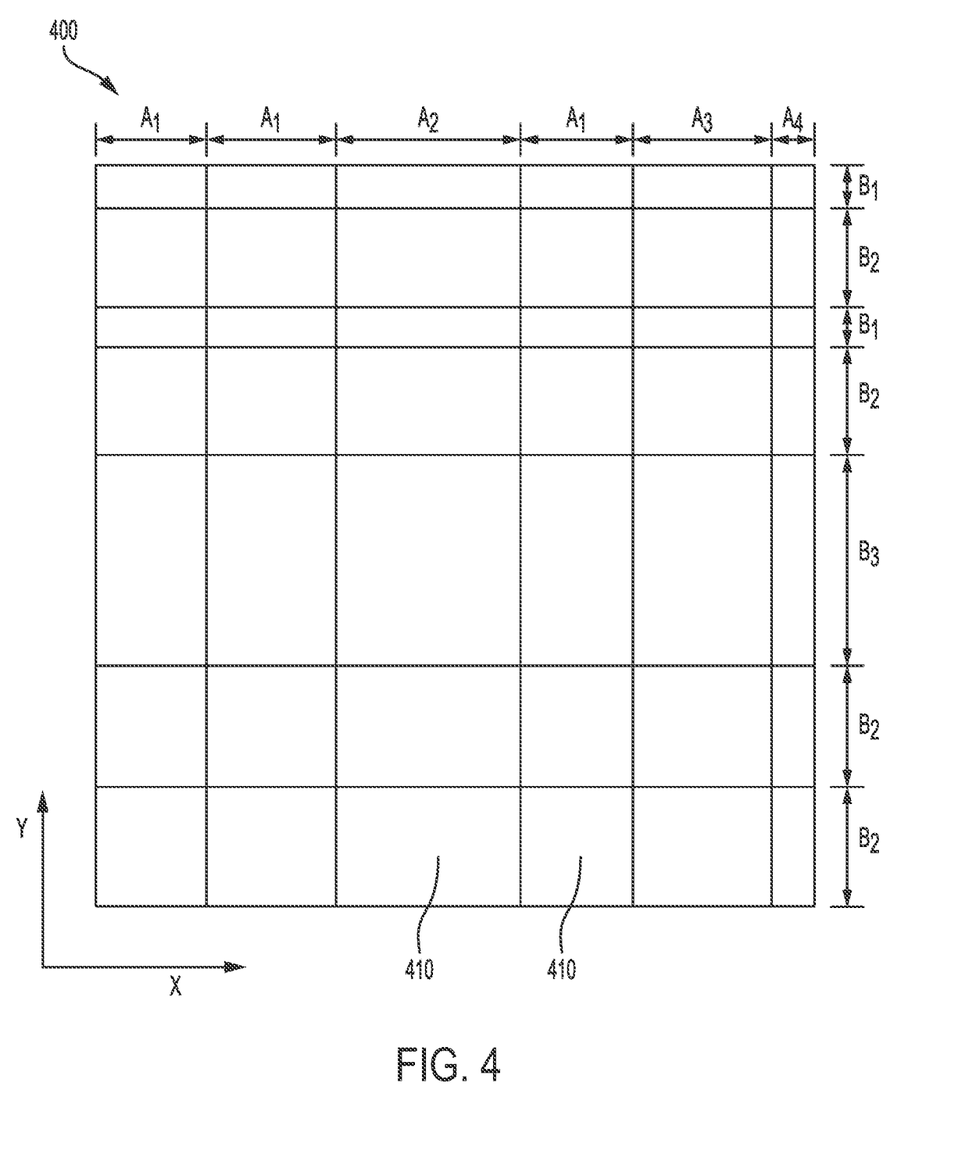
FIG. 4 illustrates a second example power grid architecture that includes power grid (PG) cells as its building blocks.

FIG. 4 illustrates a second example power grid architecture 400 that includes power grid (PG) cells 410 as its building blocks. That is, the power grid (PG) architecture 400 may include a cell building block structure with a N×M grid configuration including N cell building blocks arranged in a first direction and M cell building blocks arranged in a second direction, wherein the first direction and the second direction are orthogonal to one another. For example, the first direction may be a horizontal direction (a.k.a. x-direction), and the second direction may be a vertical direction (a.k.a. y-direction).

In the example power grid architecture 400, the building blocks in the cell building block structure may be square in shape, rectangular in shape in the x-y plane. Hence, the PG cells 410 may be square in shape or rectangular in shape in the x-y plane. In the horizontal direction (a.k.a. x-direction), four different horizontal grid dimensions are shown: $A_1, A_2, A_3$ and $A_4$. In the vertical direction (a.k.a. y-direction), three different vertical grid dimensions are shown: $B_1, B_2$ and $B_3$. In the example of FIG. 4, the dimensions of $A_4$ and $B_1$ appear to be substantially the same. Thus, a PG cell with the dimensions $A_4 \times B_1$ may have a square shape in the x-y plane. On the other hand, the dimensions of $A_1$ and $B_1$ appear to be different. Thus, a PG cell with the dimensions $A_1 \times B_1$ may have a rectangular shape in the x-y plane. One skilled in the art would understand that the example of four different horizontal grid dimensions and three different horizontal grid dimensions is four illustration purposes only, and that other quantities of different horizontal grid dimensions and/or different vertical grid dimensions are within the scope and spirit of the present disclosure.

In the example of FIG. 4, the power grid (PG) architecture 400 includes six PG cells 410 in each horizontal row and seven PG cells 410 in each vertical column. Thus, the power grid (PG) architecture 410 (shown in the example of FIG. 4) has N×M PG cells with N=6 and M=7. One skilled in the art would understand that the number for N and the number for M may be varied according to application and/or design choice without departing from the scope and spirit of the present disclosure.

In one aspect, the power grid (PG) architecture (e.g., the PG architecture 300 as shown in FIG. 3 or the PG architecture 400 as shown in FIG. 4) may include a combination of basic PG cells and optimized PC cells. In one aspect, a basic PG cell is a PG cell with a specified routability and voltage drop characteristics. The routability and/or voltage drop characteristics of a basic PG cell may be based on usage, application, manufacturing considerations, user choice and/or designer choice, etc. In one aspect, an optimized PG cell is a PG cell with routability and/or voltage drop characteristics that are optimized for a particular application which also takes into account the placement of the optimized PG cell on the power grid (PG) architecture.

The power grid (PG) architecture may be configurable to allow optimization between voltage drop and routability. In one example, the power grid (PG) architecture is a cell-based power grid which employs metal only PG cells with optimized characteristics as its architectural building block. A PG cell with optimized characteristics may be referred to as an optimized PG cell. Optimized cell characteristics may include improved routability which may be achieved by using fewer metal traces than a baseline design. An optimized PG cell with improved routability may be referred to as a routing optimized PG cell. Optimized cell characteristics may also include reduced voltage drop which may be achieved by using more metal traces than the baseline design. An optimized PG cell with reduced voltage drop may be referred to as a voltage drop optimized PG cell. Also, an optimized PG cell with a balance of improved routability and reduced voltage drop characteristics may be referred to as a hybrid optimized PG cell. The hybrid optimized PG cell may include a quantity of metal traces that is numerically between the quantity of metal traces in the routing optimized PG cell and the quantity of metal traces in the voltage drop optimized PG cell.

In one example, the baseline design is a PG cell with a default quantity of metal traces. A PG cell with the baseline design may be referred to as a basic PG cell. In one example, a basic PG cell may have Q quantity of horizontal grid lines (i.e., baseline horizontal grid lines) and R quantity of vertical grid lines (i.e., baseline vertical grid lines) as shown in FIG. 2. For example, the power grid (PG) architecture may employ one or more optimized PG cells strategically located on a hard-coded circuit macro wherein each of the one or more optimized PG cells has cell characteristics optimized for routability, voltage drop, or a balance between routability and voltage drop (i.e., hybrid).

Figure 5:
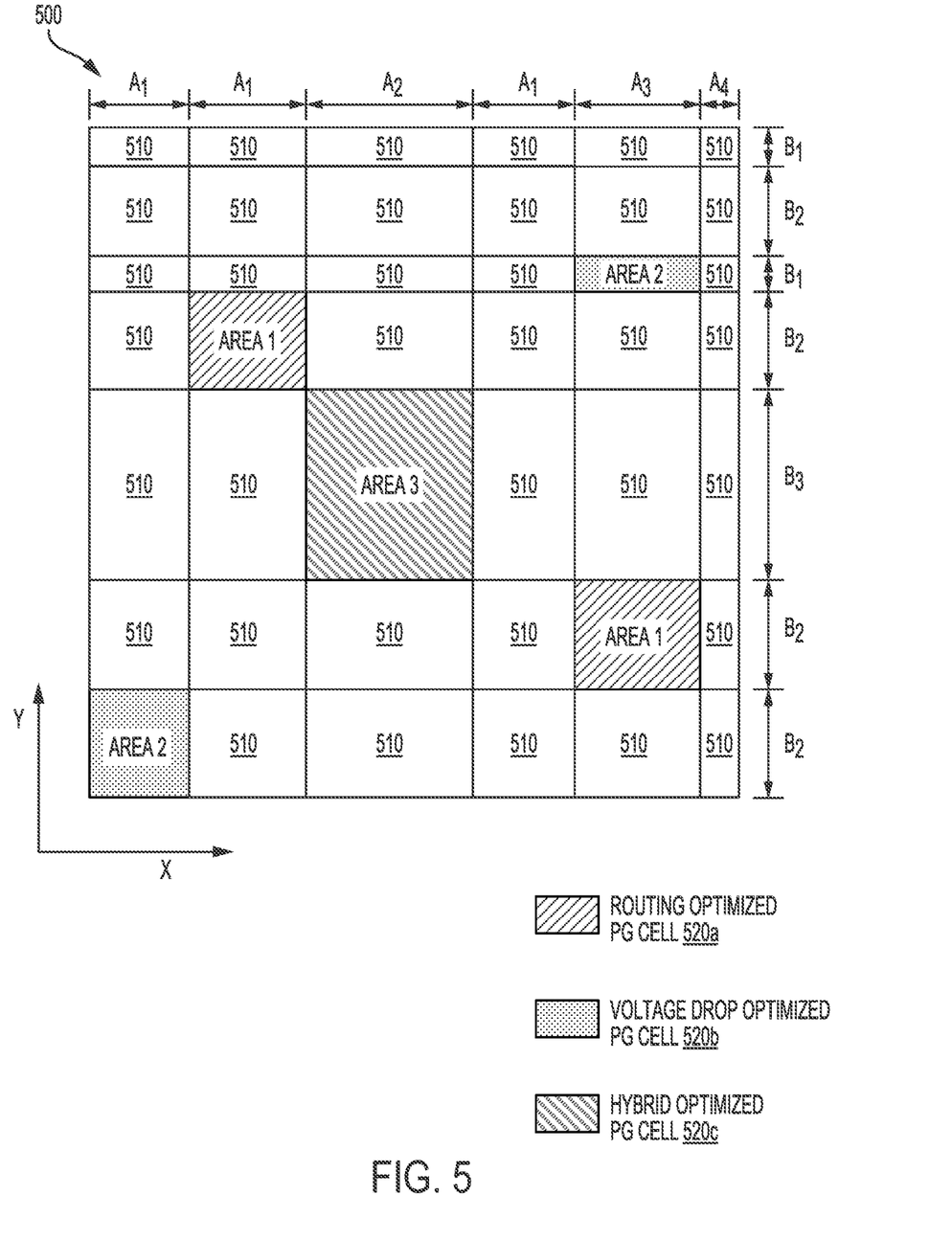
FIG. 5 illustrates an example power grid (PG) architecture that includes basic PG cells and optimized PG cells as its building blocks.

FIG. 5 illustrates an example power grid (PG) architecture 500 that includes basic PG cells 510 and optimized PG cells 520 as its building blocks. Although the power grid (PG) architecture 500 is shown to include both rectangular shaped PG cells and square shaped PG cells, one skilled in the art would understand that the power grid architecture 500 could include all rectangular shaped PG cells or all square shaped PG cells without departing from the scope and spirit of the present disclosure.

In an example, the power grid (PG) architecture 500 includes a plurality of basic PG cells 510 and a plurality of optimized PG cells 520. In this example, the plurality of optimized PG cells 520 includes three different types: a) routing optimized PG cells 520a; b) voltage drop optimized PG cells 520b; and c) hybrid optimized PG cells 520c. Each optimized PG cell 520 may be overlayed onto the power grid (PG) architecture 500 according to local optimization needs.

For example, if improved routability is desired for Area 1, then a routing optimized PG cell 520a is overlayed on Area 1. If reduced voltage drop is desired for Area 2, then a voltage drop optimized PG cell 520b is overlayed on Area 2. If both improved routability and reduced voltage drop are desired for Area 3, then a hybrid optimized PG cell 520c is overlayed on Area 3. In the example of FIG. 5, more than one Area 1 is shown and more than one Area 2 is shown. One skilled in the art would understand that the quantity of respective Area 1, Area 2 and Area 3 may vary according to the local optimization needs of the power grid (PG) architecture. In the example of the power grid (PG) architecture 500, the remaining building blocks (which are not designated Area 1, Area 2 or Area 3) include the basic PG cells 510. In one aspect, the PG cells (i.e., basic PG cells 510, routing optimized PG cells 520*a*, voltage drop optimized PG cells 520*b*, and hybrid optimized PG cells 520*c*) may be stitched together using electrical interconnects (not shown).

For example, an optimized PG cell may have $Q_{opt}$ horizontal grid lines and $R_{opt}$ vertical grid lines, where the quantity of $Q_{opt}$ differs from the quantity of horizontal grid lines in the basic PG cell. Similarly, the quantity of $R_{opt}$ differs from the quantity of R vertical grid lines in the basic PG cell. How the quantity of $Q_{opt}$ differs from the quantity of Q, and/or how the quantity of $R_{opt}$ differs from the quantity of R will depend on whether the optimized PG cell is being optimized as: a) a routing optimized PG cells (i.e., 520*a*); b) a voltage drop optimized PG cells (i.e., 520*b*); or c) a hybrid optimized PG cells (i.e., 520*c*).

For example, a routing optimized PG cell may have $Q_{optR}$ horizontal grid lines and $R_{optR}$ vertical grid lines, where $Q_{optR}$<Q and/or $R_{optR}$<R, wherein Q is the quantity of horizontal grid lines (i.e., baseline horizontal grid lines) and R is the quantity of vertical grid lines (i.e., baseline vertical grid lines) for the basic PG cell.

For example, a voltage drop optimized PG cell may have $Q_{optV}$ horizontal grid lines and $R_{optV}$ vertical grid lines, where $Q_{optV}$>Q and/or $R_{optV}$>R, wherein Q is the quantity of horizontal grid lines (i.e., baseline horizontal grid lines) and R is the quantity of vertical grid lines (i.e., baseline vertical grid lines) for the basic PG cell.

For example, a hybrid optimized PG cell may have $Q_{optH}$ horizontal grid lines and $R_{optH}$ vertical grid lines, where $Q_{optH}$ and/or $R_{optH}$ are specified to balance the routability and voltage drop needed for the particular local routability demands and/or local voltage drop demands. In the hybrid optimized PG cell, the quantity of $Q_{optH}$ horizontal grid lines and the quantity of $R_{optH}$ vertical grid lines will differ from the respective quantities in the basic cells of the power grid (PG) architecture, with the quantity differences being determined based on the desired routability and voltage drop characteristics.

In one aspect, the cell building blocks of a power grid (PG) architecture is a plurality of PG cells which may include basic PG cells, routing optimized PG cells, voltage drop optimized PG cells, and/or hybrid optimized PG cells. For example, a power grid (PG) architecture is assembled by determining the quantity of N×M PG cells, with N quantity PG cells arranged in the horizontal direction (a.k.a. x-direction) and M quantity PG cells arranged in the vertical direction (a.k.a. y-direction). In one example, the power grid (PG) architecture is implemented with N×M basic PG cells. However, before the basic PG cells are stitched together using electrical interconnects, one or more basic PC cells may be replaced with one or more optimized PG cells (routing optimized PG cell(s), voltage drop optimized PG cell(s), and/or hybrid optimized PG cell(s)). The placement of each of the optimized PG cells on a N×M grid configuration of the power grid (PG) architecture may be determined based on the local routability demands and/or local voltage drop demands In one example, the power grid (PG) architecture is assembled with a layout of each PG cells on the N×M grid configuration of the power grid (PG) architecture. For each cell building block on the N×M grid configuration, it is determined which type of PG cell is to be put in its place. For example, it is determined for each cell building block whether a basic PG cell or a particular type of optimized PG cell (routing optimized PG cell, voltage drop optimized PG cell or hybrid optimized PG cell) should be placed. Once the type of PG cell is determined for each of the cell building blocks, the different types of PG cells are placed on the N×M grid configuration of the power grid (PG) architecture. Following the placements, the PG cells are stitched together using electrical interconnects to form the power grid (PG) architecture.

Figure 6:
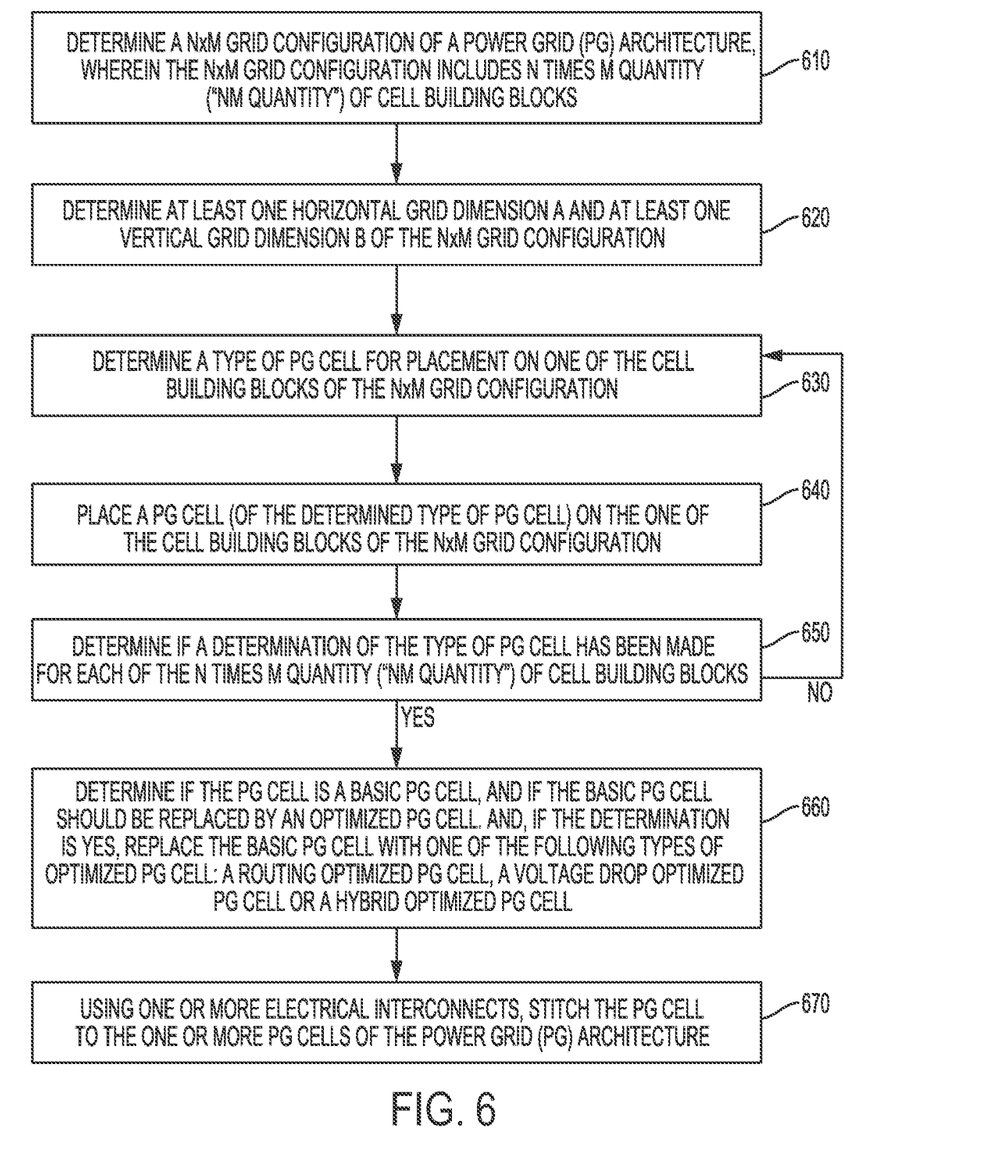
FIG. 6 illustrates an example flow diagram for placement and routing of one or more PG cells on a power grid (PG) architecture for an electronic chip.

FIG. 6 illustrates an example flow diagram 600 for placement and routing of one or more PG cells on a power grid (PG) architecture for an electronic chip. In block 610, determine a N×M grid configuration of the power grid (PG) architecture, wherein the N×M gird configuration includes N times M quantity ("NM quantity") of cell building blocks. For example, determine the quantity of N PG cells to be arranged in a horizontal direction (a.k.a. x-direction) and determine the quantity of M PG cells to be arranged in a vertical direction (a.k.a. y-direction). In one example, N and M are integer values, and N equals M. In another example, N and M are integer value, and N does not equal M. In one aspect, the determination of the N×M grid configuration may be performed by a processor which may include hardware, software, firmware, etc.

In block 620, determine at least one horizontal grid dimension A and at least one vertical grid dimension B of the N×M grid configuration. In one example, the horizontal grid dimension A equals the vertical grid dimension B, resulting in a square cell block in a x-y plane. In another example, the horizontal grid dimension A does not equal the vertical grid dimension B, resulting in a rectangular cell block in a x-y plane. In one aspect, the N×M grid configuration may include more than one horizontal grid dimension (e.g., $A_1$, $A_2$, $A_3$ . . . $A_W$), and/or the N×M grid configuration may include more than one vertical grid dimension (e.g., $B_1$, $B_2$, $B_3$ . . . $B_Z$), wherein W and Z may be any integer value to accommodate the requirements of the power grid (PG) architecture. In one aspect, the determination may be performed by a processor which may include hardware, software, firmware, etc.

In block 630, determine a type of PG cell for placement on one of the cell building blocks of the N×M grid configuration. The type of PG cell may be one of the following: a basic PG cell, a routing optimized PG cell, a voltage drop optimized PG cell or a hybrid optimized PG cell. In one aspect, the determination may be performed by a processor which may include hardware, software, firmware, etc.

In block 640, place a PG cell (of the determined type of PG cell) on the one of the cell building blocks of the N×M grid configuration. In one aspect, the placing step may be performed by a processor which may include hardware, software, firmware, etc. In one example, the placing step may be performed by an actuator, for example, a processor controlled actuator.

In block 650, determine if a determination of the type of PG cell has been made for each of the N times M quantity ("NM quantity") of cell building blocks. If yes, proceed to block 660. If no, proceed back to block 630. In one aspect, the determination may be performed by a processor which may include hardware, software, firmware, etc.

In block 660, determine if the PG cell is a basic PG cell, and if the basic PG cell should be replaced by an optimized PG cell. If the determination is yes, replace the basic PG cell with one of the following types of optimized PG cell: a routing optimized PG cell, a voltage drop optimized PG cell or a hybrid optimized PG cell. In one aspect, the determination may be performed by a processor which may include hardware, software, firmware, etc.

In block 670, using one or more electrical interconnects to stitch the PG cell to the one or more PC cells of the power grid (PG) architecture. In one aspect, the using step may be performed by a processor which may include hardware, software, firmware, etc. In one example, the using step may be performed by an actuator, for example, a processor controlled actuator.

In one example, one or more processors may be used to execute software or firmware needed to perform the steps in the flow diagram of FIG. 6. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system 301, external to the processing system, or distributed across multiple entities including the processing system. The computer-readable medium may be embodied in a computer program product. By way of example, a computer program product may include a computer-readable medium in packaging materials. The computer-readable medium may include software or firmware for placement and routing of the PG cells to the cell building blocks of the power grid (PG) architecture. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A power grid (PG) architecture, comprising:
   a cell building block structure with a N×M grid configuration including N cell building blocks arranged in a first direction and M cell building blocks arranged in a second direction, wherein the first direction and the second direction are orthogonal to one another; and a plurality of power grid (PG) cells, wherein each of the N cell building blocks and each of the M cell building blocks are occupied by a PG cell of the plurality of PG cells and wherein the plurality of PG cells includes at least one optimized PG cell having cell characteristics optimized by varying a quantity of metal traces for routability or voltage drop or a balance between routability and voltage drop.

2. The power grid (PG) architecture of claim 1, wherein the plurality of PG cells include one or more basic PG cell.

3. The power grid (PG) architecture of claim 1, wherein the at least one optimized PG cell includes at least two of the following: a routing optimized PG cell, a voltage drop optimized PG cell or a hybrid optimized PG cell.

4. The power grid (PG) architecture of claim 1, wherein the value of N equals the value of M.

5. The power grid (PG) architecture of claim 1, wherein the cell building block structure includes at least two different horizontal grid dimensions.

6. The power grid (PG) architecture of claim 5, wherein the cell building block structure includes at least two different vertical grid dimensions.

7. A method for placement and routing one or more power grid (PG) cells on a power grid (PG) architecture, the method comprising:
determining a N×M grid configuration of the power grid (PG) architecture, wherein the N×M grid configuration includes NM quantity of cell building blocks;
determining a type of PG cell for placement on one of the cell building blocks; and
placing a PG cell of the determined type of PG cell on the one of the cell building blocks, wherein the PG cell is from a plurality of PG cells and wherein the plurality of PG cells includes at least one optimized PG cell having cell characteristics optimized by varying a quantity of metal traces for routability or voltage drop or a balance between routability and voltage drop.

8. The method of claim 7, wherein the type of PG cell is one of the following: a basic PG cell, a routing optimized PG cell, a voltage drop optimized PG cell or a hybrid optimized PG cell.

9. The method of claim 7, further comprising determining if a determination of the type of PG cell has been made for each of the NM quantity of cell building blocks.

10. The method of claim 7, further comprising determining if the PG cell is a basic PG cell, and if the basic PG cell should be replaced by an optimized PG cell.

11. The method of claim 10, wherein the optimized PG cell is a routing optimized PG cell, and the routing optimized PG cell includes the quantity of metal traces that is fewer than the quantity of metal traces within the basic PG cell.

12. The method of claim 10, wherein the optimized PG cell is a voltage drop optimized PG cell, and the voltage drop optimized PG cell includes the quantity of metal traces that is more than the quantity of metal traces within the basic PG cell.

13. The method of claim 10, wherein the optimized PG cell is a hybrid optimized PG cell.

14. The method of claim 7, further comprising determining at least one horizontal grid dimension A and at least one vertical grid dimension B of the N×M grid configuration.

15. The method of claim 14, wherein the horizontal grid dimension A equals the vertical grid dimension B.

16. The method of claim 14, wherein the horizontal grid dimension A does not equal the vertical grid dimension B.

17. The method of claim 7, wherein N and M are integer values, and N equals M.

18. The method of claim 7, wherein N and M are integer values, and N does not equal M.

19. The method of claim 7, further comprising using one or more electrical interconnects to stitch the PG cell to the one or more PC cells of the power grid (PG) architecture.

20. An apparatus for placement and routing one or more power grid (PG) cells on a power grid (PG) architecture, the apparatus comprising:
means for determining a N×M grid configuration of the power grid (PG) architecture, wherein the N×M grid configuration includes NM quantity of cell building blocks;
means for determining a type of PG cell for placement on one of the cell building blocks; and
means for placing a PG cell of the determined type of PG cell on the one of the cell building blocks, wherein the PG cell is from a plurality of PG cells and wherein the plurality of PG cells includes at least one optimized PG cell having cell characteristics optimized by varying a quantity of metal traces for routability or voltage drop or a balance between routability and voltage drop.

21. The apparatus of claim 20, wherein the type of PG cell is one of the following: a basic PG cell, a routing optimized PG cell, a voltage drop optimized PG cell or a hybrid optimized PG cell.

22. The apparatus of claim 20, further comprising means for determining if a determination of the type of PG cell has been made for each of the NM quantity of cell building blocks.

23. The apparatus of claim 20, further comprising means for determining if the PG cell is a basic PG cell, and means for determining if the basic PG cell should be replaced by an optimized PG cell.

24. The apparatus of claim 23, wherein the optimized PG cell is a routing optimized PG cell, and the routing optimized PG cell includes the quantity of metal traces that is fewer than the quantity of metal traces within the basic PG cell.

25. The apparatus of claim 23, wherein the optimized PG cell is a voltage drop optimized PG cell, and the voltage drop optimized PG cell includes the quantity of metal traces that is more than the quantity of metal traces within the basic PG cell.

26. The apparatus of claim 23, wherein the optimized PG cell is a hybrid optimized PG cell.

27. The apparatus of claim 20, further comprising means for determining at least one horizontal grid dimension A and at least one vertical grid dimension B of the N×M grid configuration.

28. The apparatus of claim 7, further comprising means for stitching one or more electrical interconnects to the PG cell to the one or more PC cells of the power grid (PG) architecture.

29. A computer-readable medium storing computer executable code, operable on a device comprising at least one processor and at least one memory coupled to the at least one processor, wherein the at least one processor is configured to place and route one or more power grid (PG) cells on a power grid (PG) architecture, the computer executable code comprising:
instructions for causing a computer to determine a N×M grid configuration of the power grid (PG) architecture, wherein the N×M grid configuration includes NM quantity of cell building blocks;

instructions for causing the computer to determine a type of PG cell for placement on one of the cell building blocks;

instructions for causing the computer to place a PG cell of the determined type of PG cell on the one of the cell building blocks, wherein the PG cell is from a plurality of PG cells and wherein the plurality of PG cells includes at least one optimized PG cell having cell characteristics optimized by varying a quantity of metal traces for routability or voltage drop or a balance between routability and voltage drop; and instructions for causing the computer to use one or more electrical interconnects to stitch the PG cell to the one or more PC cells of the power grid (PG) architecture.

* * * * *